(12) United States Patent
Krig

(10) Patent No.: US 10,321,009 B2
(45) Date of Patent: *Jun. 11, 2019

(54) PROTOCOL FOR COMMUNICATIONS BETWEEN PLATFORMS AND IMAGE DEVICES

(71) Applicant: Intel Corporation, Santa Clara, CA (US)

(72) Inventor: Scott A. Krig, Folsom (CA)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/274,113

(22) Filed: Sep. 23, 2016

(65) Prior Publication Data

US 2017/0048414 A1 Feb. 16, 2017

Related U.S. Application Data

(63) Continuation of application No. 13/603,738, filed on Sep. 5, 2012, now Pat. No. 9,479,677.

(51) Int. Cl.
*G06K 9/00* (2006.01)
*H04N 1/00* (2006.01)
(Continued)

(52) U.S. Cl.
CPC ..... *H04N 1/32117* (2013.01); *H04N 1/00129* (2013.01); *H04N 1/00251* (2013.01);
(Continued)

(58) Field of Classification Search
CPC .......................... H04L 29/06387; H04L 45/00
(Continued)

(56) References Cited

U.S. PATENT DOCUMENTS 9,479,677 B2 * 10/2016 Krig ................... H04N 5/23203
2007/0046966 A1 3/2007 Mussack et al.
(Continued)

FOREIGN PATENT DOCUMENTS

CN 101237568 A 8/2008
CN 201248107 Y 5/2009
(Continued)

OTHER PUBLICATIONS

Office Action received for Japanese Patent Application No. 2015-530145, dated Dec. 13, 2016, 6 pages including 3 pages English translation.

*Primary Examiner* — Christopher R Crompton

(57) ABSTRACT

In accordance with some embodiments, a protocol permits communications between platforms and image devices. This allows, for example, the platform to specify particular types of information that the platform may want, the format of information the platform may prefer, and other information that may reduce the amount of processing in the platform. For example, conventionally, in gesture recognition software, the platform receives an ongoing stream of video to be parsed, searched and processed in order to identify gestures. This may consume communications bandwidth between platforms and imaging devices, particularly in cases where wireless communications or other bandwidth limited communications may be involved.

28 Claims, 3 Drawing Sheets

(51) Int. Cl.
*H04N 1/32* (2006.01)
*H04N 1/44* (2006.01)
*H04N 1/60* (2006.01)
*H04N 5/232* (2006.01)

(52) U.S. Cl.
CPC ..... *H04N 1/00278* (2013.01); *H04N 1/00307* (2013.01); *H04N 1/44* (2013.01); *H04N 5/23203* (2013.01); *G06K 9/00221* (2013.01); *G06K 9/00335* (2013.01); *H04N 1/6058* (2013.01); *H04N 2201/0055* (2013.01); *H04N 2201/0074* (2013.01)

(58) Field of Classification Search
USPC .......................................................... 370/389
See application file for complete search history.

(56) References Cited

U.S. PATENT DOCUMENTS

| | | | |
|---|---|---|---|
| 2007/0255710 A1 | 11/2007 | Kagawa | |
| 2009/0006375 A1* | 1/2009 | Lax | H04N 21/435 |
| 2009/0054102 A1* | 2/2009 | Jung | H04N 7/148 |
| | | | 455/556.1 |
| 2009/0174798 A1 | 7/2009 | Nilsson | |
| 2009/0191852 A1* | 7/2009 | David | H04M 3/42017 |
| | | | 455/414.1 |
| 2010/0231970 A1* | 9/2010 | Higuchi | H04N 1/00214 |
| | | | 358/1.15 |
| 2012/0327258 A1* | 12/2012 | Holland | G06K 9/00228 |
| | | | 348/222.1 |
| 2013/0101162 A1* | 4/2013 | Vitsnudel | G06F 3/042 |
| | | | 382/103 |
| 2013/0141572 A1* | 6/2013 | Torres | H04N 7/185 |
| | | | 348/143 |

FOREIGN PATENT DOCUMENTS

| | | |
|---|---|---|
| CN | 101755454 A | 6/2010 |
| JP | 2003-244377 A | 8/2003 |
| JP | 2004-320199 | 11/2004 |
| JP | 2006332869 A | 12/2006 |
| JP | 2009100371 | 5/2009 |
| JP | 2012138013 A | 7/2012 |
| JP | 20118422 | 8/2012 |

* cited by examiner

PROTOCOL FOR COMMUNICATIONS BETWEEN PLATFORMS AND IMAGE DEVICES

CROSS-REFERENCE TO RELATED APPLICATION

This application is a continuation application claiming priority to U.S. patent application Ser. No. 13/603,738 filed Sep. 5, 2015, hereby expressly incorporated by reference herein.

BACKGROUND

This relates generally to computer controlled devices including imaging device peripherals such as printers, monitors or displays and cameras.

Conventional computer platforms such as laptop computers, desktop computers, and tablets, to mention some examples, may interface and receive information from imaging devices. As used herein an "image device" is anything that can produce or display an image, including a monitor, a display, a camera, a image sensor, a printer, or a fax machine.

Conventionally, the platform simply receives raw data from the imaging device and then performs the necessary processing of the raw data.

BRIEF DESCRIPTION OF THE DRAWINGS

Some embodiments are described with respect to the following figures.

DETAILED DESCRIPTION

Figure 1:
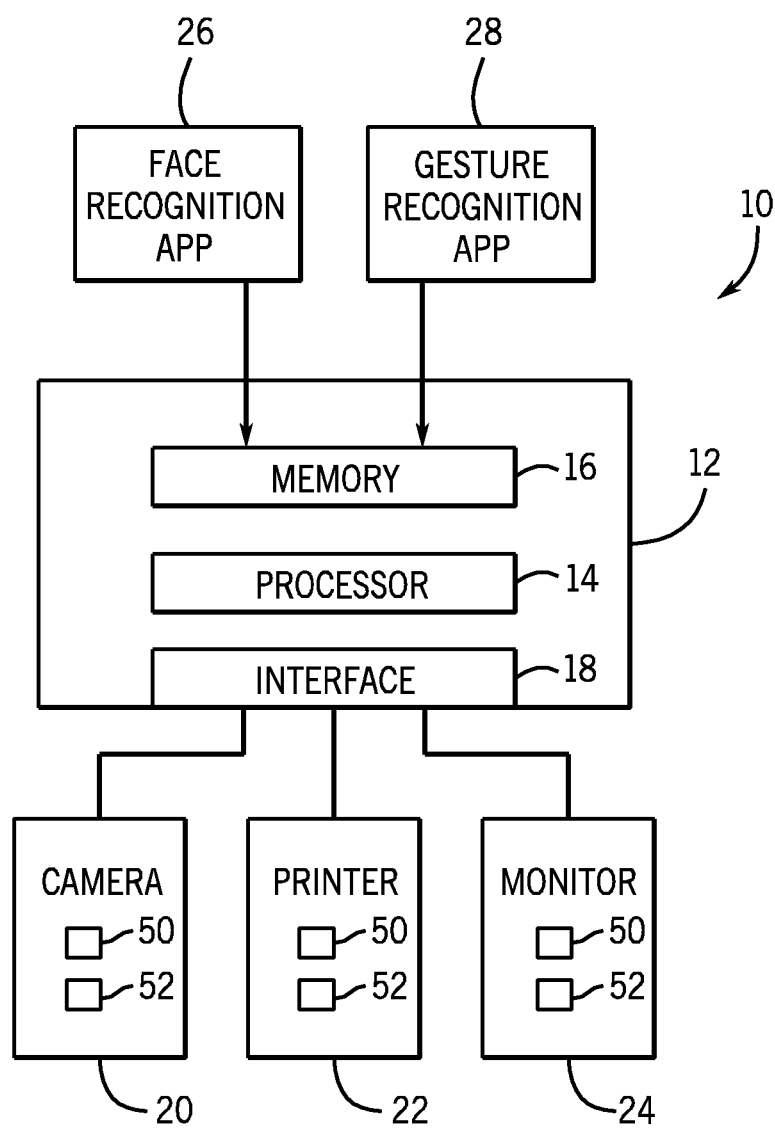
FIG. 1 is a block diagram of one embodiment to the present invention.

In accordance with some embodiments, a protocol permits communications between platforms and image devices. This allows, for example, the platform to specify particular types of information that the platform may want, the format of information the platform may prefer, and other information that may reduce the amount of processing in the platform. Thus, a protocol may provide standardized methods for control and status information to pass between devices, such as control messages to get device capabilities and change processing features and behavior, and status messages to indicate available device features and options. For example, conventionally, in gesture recognition software, the platform receives an ongoing stream of video to be parsed, searched and processed in order to identify gestures. This may consume communications bandwidth between platforms and image devices, particularly in cases where wireless communications or other bandwidth limited communications may be involved. Thus it is advantageous, in some embodiments, to enable communication between platform and imaging device to specify that information which is desired by the platform, for example reducing the need to transmit unnecessary data that will simply be discarded anyway.

Similarly, any image sink, such as a display, a monitor, a printer, or fax machine, may specify to the image source, such as a computer system or platform, the format in which it wants to receive the data. For example, a display or printer that needs particular data types, particularly data densities, or particular protocols using particular margins can specify this information to the source. Then the source can do the processing to supply the information to the image sink. Also, a protocol embodiment of this invention may include actual cameras, printers and displays as well as processing units to act on behalf of the cameras and displays, as well as virtual cameras, printers and displays that operate within another device. For example, a laptop computer device may run a virtual camera which can communicate using this protocol to a real printer, where the virtual camera acts on behalf of the dumb laptop camera and provides a smart wrapper to implement this protocol.

Likewise image sources can specify the characteristics of image data that they can provide, offering alternatives for the selection of other formats and receiving feedback from the sink device about the format that is preferred, in some embodiments.

Image devices may include displays, printers, image processors, image sensors, and fax machines, to mention some examples. In some embodiments, these peripheral devices have sufficient intelligence to perform data analysis and manipulation and to receive commands and to communicate a response to those commands. Thus, generally these peripherals will be processor-based systems that also include a memory or a storage.

Potential applications include facial recognition, objection recognition, scene recognition, perceptual oriented information about light sources and direction vectors in a scene, colorimetric properties of the source and destination devices.

As an initial example, an image sensor in a camera for example may contain intelligence to alter the type of processing performed or to alter the corresponding metadata produced to meet the needs of the consuming endpoint platform. For example, some platforms may want processed image metadata in the form of metrics such as interest point coordinates, object coordinates, object counts, and other descriptor information either with or without video or other image information. Another imaging device such as a printer may want no metadata and may just request raw video processed in a particular manner.

As another example, a smart camera may be instructed to look for faces with certain attributes. A smart printer may tell a camera to deliver raw image data that fits into the printer's color space device model for optimal print rendering while allowing smart application software to ask the camera to prepare a three-dimensional depth map of a scene at ten frames per second. Similarly, a printer or display may ask the camera to provide the locations and regions of a range of objects, such as faces, so that the printer or display may perform smart enhancements of the objects, such as face regions, in an optimized manner to achieve best viewing results. Thus, an image capture device may be able to recognize a wide range of objects and communicate information about the objects to a printer or display using a standardized protocol of the type described herein, allowing the printer, display or other rendering device to optimize the rendering.

Thus in some embodiments a standardized bidirectional protocol may be implemented to allow communication of specifications for imaging data between platform and peripheral. In some embodiments this may result in more efficient transfer of data and the reduction of the transfer of unnecessary data.

The protocol can be embodied at a high level as Extensible Markup Language (XML), American Standard Code for Information Exchange (ASCII) text commands streams sent bi-directionally between imaging devices over existing standard hardware protocol methods used by cameras including but not limited to as universal serial bus (USB), Mobile Industry Processor Interface (MIPI) (specifications available from MIPI Alliance, Inc.), Peripheral Components International Express (PCIE), 3.05 specification (PCI Special Interest Group, Beaverton, Oreg. 97006, 2010-10-8) or the protocol may be an extension of existing hardware protocols. Alternatively, a new hardware protocol may be devised as a bidirectional channel for example in MIPI, USB, PCIE or even with video standards such as H.265 (High Efficiency Video Coding, February 2012, available from Fraunhofe Heinrich Hertz Institute) and CODEC formats. See H.265 available from ISO/IEC Moving Pictures Experts Group (MPEG).

Use cases include smart protocol enabled printers advising a smart protocol-enabled camera how to process images to be optimally printed given the color gamut of each device. Another use case is a smart protocol-enabled camera that can be configured to only produce information when a certain face is seen, allowing the face details to be sent to the smart camera device with corresponding face match coordinates and confidence levels to be sent to the platform, with or without the corresponding image. This exchange may involve sending standardized sets of interest or descriptor sets to search for, such as look for faces with these characteristics, look for the following gestures, look for the following objects, and only report when the object is found and then send the coordinates, descriptor information, confidence level and an entire image frame or frame portion containing the object.

Other use examples include smart protocol-enabled displays that can send their colormetrically accurate gamut map and device color model to a camera to enable a camera to produce optimal images for that display. Another application involves face tracking application software enabling using a communication protocol to send commands to a smart protocol-enabled camera sensor chip to request only coordinates on face rectangles, along with corresponding interest points and other image descriptor details. As one additional application, a three-dimensional printer may use a communications protocol and communications channel to send configuration commands to a smart 3D camera. These configuration commands may include specific commands or instructions for various three-dimensional (3D) sensors technologies including but not limited to stereo, time-of-flight (TOF), structure light and the like. A 3D printer then only requests a depth map and set of triangles in a 3D triangle depth mesh as well as textures on each triangle in the 3D triangle depth mesh from the image sensor camera device with corresponding colors of each polygon and a depth map to enable a three-dimensional model to be printed directly from the camera depth map and color information on the three-dimensional printer, or the 3D triangle depth mesh, and the same 3D triangle depth mesh may be provided to a 3D display as well by a standardized protocol of the type described herein, to enable full 3D rendering on the display.

Thus referring to FIG. 1, a computer system 10 may include a platform 12 with memory 16, a processor 14, and an interface 18. Interface 18 may interface with imaging devices such as a camera 20, a printer 22, and a monitor 24. Each of the devices 20, 22 and 24 may be hardware devices with hardware processors 50 and internal storage 52. Also stored in the memory 16 may be a face recognition application 26 and a gesture recognition application 28. A protocol of the type described herein will allow for devices to program each other to perform special functions, for example a smart printer may send program source code or executable code to a smart camera to perform specific processing on behalf of the printer.

The interface 18 may implement one of a variety of different interfaces including MIPI, USB, Unified Extensible Firmware Interface (UEFI) (UEFI Specification, v. 2.3.1, Apr. 18, 2011), Hypertext Markup Language (HTML), or even Transmission Control Protocol/Internet Protocol (TCP/IP) sockets or Uniform Data Protocol (UDP) datagrams. Other communication channels include both wired and wireless networks. The interface may implement a protocol that may be a request/response protocol, a polled protocol, or an event or interrupt event protocol to mention some examples. The protocol may also use Command and Status Register (CSR) shared memory or register interface or a stream protocol interface such as HTTP, datagrams in a socket over TCP/IP to mention a few examples. Any protocol method may be used in connection with some embodiments of the present invention.

Figure 2:
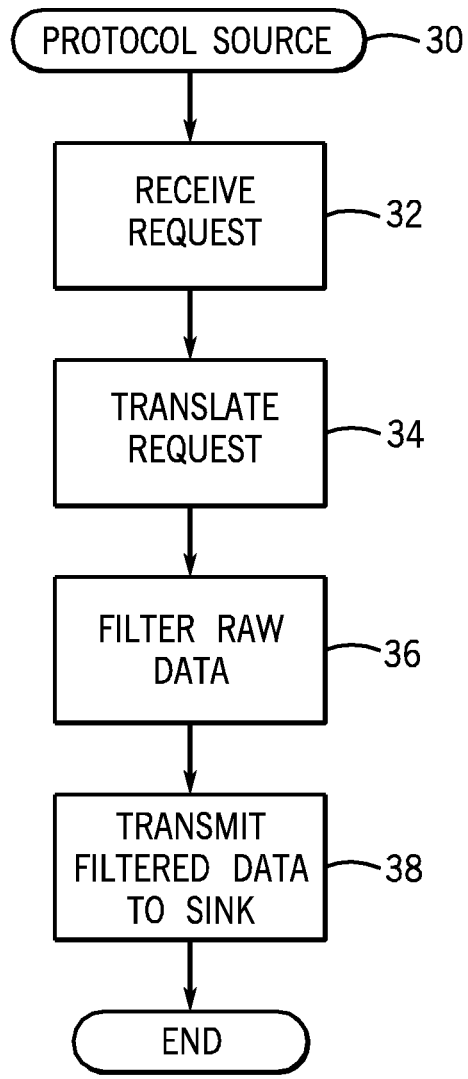
FIG. 2 is a flow chart for one embodiment to the present invention.
Figure 3:
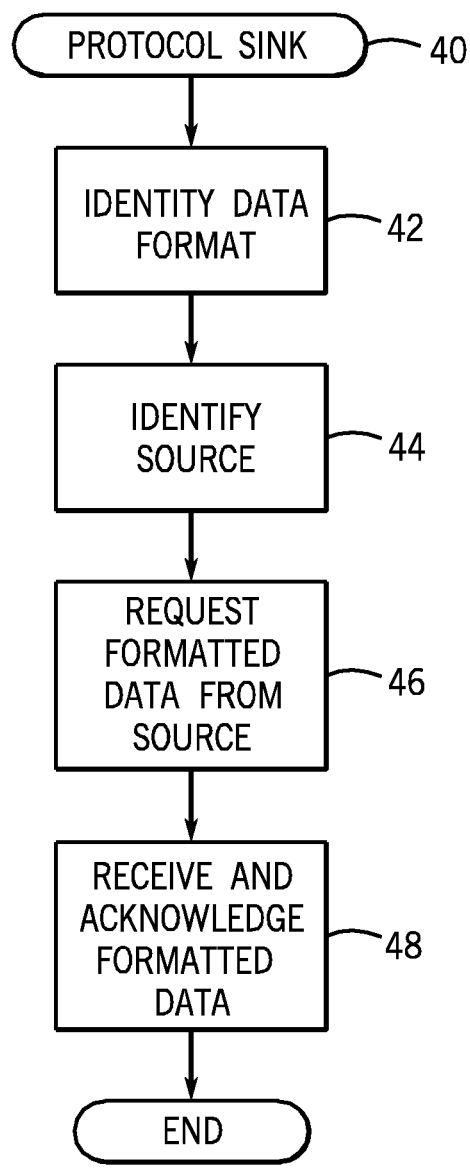
FIG. 3 is a flow chart for another embodiment to the present invention.

Sequences shown in FIGS. 2 and 3 including the protocol source sequence 30 in FIG. 2 and the protocol sink sequence 40 shown in FIG. 3 may be implemented in software, firmware and/or hardware. In software and firmware embodiments, the sequences may be implemented by one or more non-transitory computer readable media storing computer executed instructions. The non-transitory computer readable media may be optical, magnetic and/or semiconductor memories in some embodiments.

Referring to FIG. 2, the protocol source sequence 30, for requesting data, begins with receiving a request as indicated in block 32. The request may be received at a platform or at a peripheral device such as a camera. The request may be translated into appropriate commands useful within the video receiving/requesting device as indicated in block 34. Then the raw data that may be received may be filtered as indicated in block 36 to place it into the form set forth in the request. Thus, the format may include various data formats, various data sizes, specifications of particular objects to locate in data and images, locating particular text items or any other requests. Then the filtered data is transmitted to the sink as indicated in block 38. The sink may be the receiving device such as a monitor or the platform in some embodiments.

FIG. 3 shows the protocol sink sequence 40 which is the device consuming the data. The sequence 40 begins by identifying a data format in block 42. The protocol sink sequence, for example may be implemented on the platform or the display as two examples. Then a potential source of the data (e.g. camera) may be identified in block 44. Next the data is requested from the source in a particular format that has already identified in block 42 as indicated in block 46. Then the formatted data is received and acknowledged as indicated in block 48.

The metadata that may be used may be communicated between the platform and the imaging devices may be in various formats including XML. The protocol metadata may implement the syntax of the software metadata command and status. A selected set of protocol directives may be used to allow bidirectional communications between platforms and imaging devices.

A plurality of different commands may be developed or default commands may be provided. Each command may return a status code showing success, fail or failure code, in addition to returning any useful requested information. As a first example of a command, an image preprocessing pipeline request or response may specify items like sharpening, contrast enhancement or HISTEQ, as examples. An image format request or response command may be specify the color space that should be used such as RGB, the patterns that may be used such as BAYER, YUV 422, YUV 444, HSD, Luv, or the like and dimensions such as whether x/y dimensions should be used.

Still another possible command as an optimize command that includes a request and a response to specify the devices and applications for which a camera will optimize both the images and the metadata. This may be based on a published list of profiles of device models for a list of known devices that are participating in this technology. Those profiles may be built into the camera or retrieved from the camera from a network or storage device on demand. This arrangement enables the camera to optimize the image further color gamut of a device or for a given application like face recognition. Thus, standard configurations of devices may be registered and stored online in a well-known location, allowing a standardized protocol of the type described herein, to be used to obtain device configurations or set device configurations used by this protocol.

Another potential command is interest point request or response to specify the types of interest points desired. Still another example of a command is descriptors request and response to specify the type of region descriptors around the interest points. Other commands include light sources request and response to specify the light source colors and direction vectors to be returned. Other examples include requests and response to device color model to return the color model of the device. The request or response may include some combination of desired information such as a mathematical model of the color gamut of the device and Low Level Virtual Machine (LLVM) code such as Java byte code. Still another command is a depth map request and response to specify the format to be returned in the depth map. Possibilities exist in protocol embodiments to specify the computer memory data formats including integer and floating point precision, integer 8, or integer 16, x/y dimensions of image regions, and characteristic formats of depth maps to include polygon 3D mesh points and point or pixel depth maps.

The following chart gives example commands, with descriptions, and an extensible markup language (XML) sample embodiment. Each command may return a status code showing success, fail, or failure code in addition to returning any useful requested information.

| Command | Description | XML sample embodiment |
| --- | --- | --- |
| Image pre-processing Pipeline REQUEST RESPONSE | Specify items like sharpening, contrast enhancement, HISTEQ, etc. | <processing><br>  <pipeline><br>    <sharpen_type1 /><br>    <histeq /><br>  </pipeline><br></processing> |
| Image format REQUEST RESPONSE | Specify raw RBG, BAYER, YUV422, YUV444, HSV, Luv, etc. Dimension (x/y dimension) | <imageFormat><br>  <RGB16bbp /><br>  <dimension = "640x480" /><br></imageFormat> |
| Optimize REQUEST RESPONSE | Specify the devices and apps for which a camera will optimize both 1) the images and 2) meta-data, this is based on a published list of profiles device model etc. for a list of known devices that are participating in the VDP standard, which profiles can be built into the camera or retrieved by the camera from a network or storage device on demand. This enables the camera to optimize the image for the color gamut of a device, or for a given application like face recognition. | <optimizeImage><br>  <HP_printer_model123 /><br>  <Sharp_3d_display_model_123 /><br>  <Face_recognition_app_from_Metao /><br></optimizeImage> |
| Interest Points REQUEST RESPONSE | Specify the type of interest points desired (harris Corner, Canny, LBP, etc.) | <interestPoints><br>  <Canny /><br></interestPoints> |
| Descriptors REQUEST RESPONSE | Specify the type of region descriptors around the interest points (ORB, HOG, SIFT, GLOH, DAISY, etc.) | <descriptor><br>  <SIFT /><br>  <GLOH /><br></descriptors> |
| LightSources REQUEST RESPONSE | Specify that light source colors & directional vectors are to be returned | <lightSources><br>  <request3DLightVector /><br>  <requestLightColor /><br></lightSources> |

-continued

| Command | Description | XML sample embodiment |
|---|---|---|
| Device Color Model REQUEST RESPONSE | Return the color model of the device, this is some combination of desired information such as the mathematical model in LLVM of Java Bytes Code of the color gamut of the device [with white point, black point, neutral gray axis, RGB max values, Jch max] values. | <deviceColorModel><br>  <mathematicalModel /><br>  <colorGamut /><br></DEVICEcOLORmODEL> |
| Depth map REQUEST RESPONSE | Specify the format for the returned depth map (precision [int8, int16[, x/y dimension, include_polygon_3Dmesh_points, include_pixel_depth_map) | <depthMap><br>  <precision = "int16" /><br>  <include_pixel_depth_map /><br>  <include_polygon_3dmesh /><br></depthMap> |
| List Primitives REQUEST RESPONSE | List the primitive functions the device is capable of running. This may also return a compatability level such as LEVEL 1 which means that the device supports all primitives and capabilities in LEVEL 1. | <listPrimitives><br>  <all /><br>  <compatabilityLevelOnly /><br></listPrimitives> |
| Accept Primitives REQUEST | Send JAVA byte code or LLVM code to a smart device, the code is an algorithm to run, assumes the device has a processor and can accept & execute the code. The code can then be run by name later on command. | <acceptPrimitive><br>  <code = "10102399903ABBCBD1232300C"<br>  </code><br>  <name = "nameOfThIsCode" /><br>  <whenToRun = "at_startup" /><br></accceptPrimitive> |
| Run Primitive REQUEST | Run a primitive by name | <runPrimitive><br>  <name = "someCoolPrimitive" /><br></runPrimitive> |
| Create Pipeline REQUEST | Create a pipeline from a sequence of primitives | <pipeline><br>  <name = "primitive1" /><br>  . . .<br>  <name = "primitive n" /><br><//pipeline> |
| Search Method REQUEST (split transaction w/Search Results) | Specify what the smart camera should look for, what meta-data it should return, how much meta-data, and how often to return the meta-data | <searchMethod><br>  <name = "faces_method1" /><br>  <interestPoints = "HarrisCorner" /><br>  <ponitCount = "1000_max" /><br>  <descriptors = "ORB" /><br>  <descriptorCount = "100_max> /<br>  <result = "return_every_10_frames" /><br>  <frames = "every_10$^{th}$_image_frame" /><br></searchMethod> |
| Search Target REQUEST (split transaction w/Search Results) | Specify what the smart camera should look for, this allows the camera to be told which types of corner points to look for, which types of faces to look for, which types of cars to look for, etc. | <searchMethod><br>  <target = "faces_method1" /<br></searchMethod> |
| Search Results RESPONSE (split transaction w/Search Method) | Receive the results from the corresponding search command, results will come in periodically as specified in the Search Method command. | <searchResults><br>  <descriptor id="1><br>    <interestpoint x="223" y="533" /<br>    . . .<br>    <Descriptor vector="100Ba..." / /><br>    . . .<br>  </descriptor><br>  <imageFrame><br>    <data " . . ." /></data><br>  </imageFrame><br></searchResults> |

Some embodiments also allow specific image processing and video analytics protocols to be created, such a sequential combination such as sharpen image, color correct image, look for faces, send face coordinates to printer, or send image to printer.

Other command list of primitives command to list the primitive functions the device is capable of running except primitives request to send a Java byte code or LLVM code to a smart device. The code may be an algorithm to run and assumes the device has a processor and can accept and execute the code which can then be run by name later on command. Run primitive command may be a request to run a primitive by name. Create command may create a pipeline from a sequence of primitives. Search method command may be a request to specify what the smart camera should look for, what metadata should return and how much metadata, and how often to return the metadata. Search target command is a request that specifies what the smart camera should look for. This allows the camera to be told which types of corner points to look for, which types of faces to look for, and which type of cars to look for, as examples. Finally a search results command may be a response to receive the results from the corresponding search command. The results may come in periodically as specified by the search method command.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving, at a processor, a message from an external platform;
   performing object recognition on one or more images captured by an image sensor coupled to the processor in response to receiving the message;
   generating metadata in response to having recognized at least one object in the image; and
   making the metadata available to the external platform.

2. The method of claim 1, wherein the metadata comprises object counts.

3. The method of claim 1, wherein the message comprises part of a standardized protocol.

4. The method of claim 1, wherein object recognition comprises facial recognition.

5. The method of claim 1, wherein the message specifies the metadata to be provided.

6. The method of claim 1, wherein the metadata comprises XML metadata.

7. The method of claim 1, wherein the message is to be received over an Internet Protocol (IP) compatible network.

8. At least one non-transitory computer readable media storing instructions that in response to being executed by a processor, cause the processor to:
   receive, at the processor, a message from an external platform;
   perform object recognition on one or more images captured by an image sensor coupled to the processor in response to receiving the message;
   generate metadata in response to having recognized at least one object in the image; and
   make the metadata available to the external platform.

9. The at least one machine readable medium of claim 8, wherein the metadata comprises object counts.

10. The at least one machine readable medium of claim 8, wherein the message comprises part of a standardized protocol.

11. The at least one machine readable medium of claim 8, wherein object recognition comprises facial recognition.

12. The at least one machine readable medium of claim 8, wherein the message specifies the metadata to be provided.

13. The at least one machine readable medium of claim 8, wherein the metadata comprises XML metadata.

14. The at least one machine readable medium of claim 8, wherein the message is to be received over an Internet Protocol (IP) compatible network.

15. A camera, comprising:
   an image sensor to capture one or more images; and
   a processor, the processor:
      to receive a message from an external platform, the message to cause the processor to perform object recognition on the one or more images;
      to generate metadata in response to having recognized at least one object in the image; and
      to make the metadata available to the external platform.

16. The camera of claim 15, wherein the metadata comprises object counts.

17. The camera of claim 15, wherein the message comprises part of a standardized protocol.

18. The camera of claim 15, wherein object recognition comprises facial recognition.

19. The camera of claim 15, wherein the message specifies the metadata to be provided.

20. The camera of claim 15, wherein the metadata comprises XML metadata.

21. The camera of claim 15, wherein the message is to be received over an Internet Protocol (IP) compatible network.

22. An apparatus comprising:
   an image sensor means to capture one or more images; and
   a processor means coupled to the image sensor means, the processor means to:
      receive a message from an external platform, the message to cause the processor means to: perform object recognition on the one or more images;
      generate metadata in response to having recognized at least one object in the image; and
      make the metadata available to the external platform.

23. The apparatus of claim 22, wherein the metadata comprises object counts.

24. The apparatus of claim 22, wherein the message comprises part of a standardized protocol.

25. The apparatus of claim 22, wherein object recognition comprises facial recognition.

26. The apparatus of claim 22, wherein the message specifies the metadata to be provided.

27. The apparatus of claim 22, wherein the metadata comprises XML metadata.

28. The apparatus of claim 22, wherein the message is to be received over an Internet Protocol (IP) compatible network.

\* \* \* \* \*